United States Patent [19]

Berger

[11] Patent Number: 5,677,517

[45] Date of Patent: Oct. 14, 1997

[54] GRAVIMETRIC WEIGHING HOPPER

[75] Inventor: Daniel E. Berger, Charlotte, N.C.

[73] Assignee: LCI Corporation International, Charlotte, N.C.

[21] Appl. No.: 365,756

[22] Filed: Dec. 29, 1994

[51] Int. Cl.⁶ .................. G01G 23/00; G01G 13/22; G01G 13/00; B67D 5/06
[52] U.S. Cl. .................. 177/162; 177/162; 177/98; 177/116; 177/180; 222/77; 222/185; 222/325
[58] Field of Search .................. 177/98, 105, 116, 177/126, 161, 162, 180, 181; 141/83; 222/325, 77, 185

[56] References Cited

U.S. PATENT DOCUMENTS

| | | |
|---|---|---|
| 4,013,745 | 3/1977 | Brinkmann et al. . |
| 4,101,613 | 7/1978 | Norwood . |
| 4,209,476 | 6/1980 | Harris . |
| 4,452,750 | 6/1984 | Handwerk et al. . |
| 4,478,775 | 10/1984 | Endo et al. . |
| 4,501,498 | 2/1985 | McKelvey . |
| 4,663,103 | 5/1987 | McCullough et al. . |
| 4,944,903 | 7/1990 | Nilsson . |
| 5,122,315 | 6/1992 | Darley . |

*Primary Examiner*—Michael L. Gellner
*Assistant Examiner*—Anh Mai
*Attorney, Agent, or Firm*—Shefte, Pinckney & Sawyer

[57] ABSTRACT

In a gravimetric weighing hopper, an infeed chute on the fixed hopper frame and a removable annular wall supported by a load cell are formed with respective annular edges which are angled relative to their aligned axes or are correspondingly notched or otherwise have annular portions about at least approximately one-half of their respective annular extents which are spaced axially from their remaining annular extents to enable the removable cylindrical wall to be spaced in close surrounding relation to the feed chute during normal operation and also to be readily manipulated relative to the feed chute when necessary or desired to be removed from the hopper.

12 Claims, 4 Drawing Sheets

GRAVIMETRIC WEIGHING HOPPER

BACKGROUND OF THE INVENTION

The present invention relates generally to apparatus for extruding thermoplastic material and, more particularly, to such apparatus having means for monitoring and controlling deviations in the output of a thermoplastic extruder, especially utilizing a gravimetric weighing hopper for feeding charge material to the extruder.

Many various forms of thermoplastic polymeric material are conventionally extruded into a wide variety of products including sheets, film, rods, tubes, and strands, as well as various other products. Basically, the extrusion process involves melting of the thermoplastic material employed, and sufficient pressurization of the melted material to cause it to flow at a desired rate, through an appropriate die to form the intended end product. An important determination of the quality of the end product is its conformity within acceptable tolerances to predetermined dimensional and weight specifications. As a general principle, the quality of an extruded product tends to decrease as the extrusion rate increases. Especially in extrusion operations wherein a high degree of uniformity in the end product is required, such as by way of example in the extrusion of medical tubing (e.g., catheter tubes), it is therefore desirable to operate an extruder at a relatively low throughput rate in order to optimize the uniformity and attendant quality of the extruded product.

Conventional apparatus for extruding thermoplastic material typically includes a cylindrical barrel in which is rotatably disposed a conveying screw. The thermoplastic material is fed in a solid pellet or powder form into the barrel at one end and conveyed to the other end of the barrel by rotation of the screw. The heat required to transform the thermoplastic material from a solid at room temperature to a molten material at the desired extrudate temperature is typically generated by equipping the extruder with heating elements.

Conventional extruders are widely recognized to be disadvantageously subject to undesirable deviations in the quality of the extruded product. While the volumetric input of the thermoplastic material to the extruder and the operational parameters of the extruder, e.g., rotational speed of the screw and temperature of the extruder heaters, may be maintained substantially constant, variations in the thermoplastic material such as its density and viscosity as well as variations in the operating conditions of the extruder such as uneven temperature distribution and backpressurization cause unacceptable variations in the quality of the extruded product exceeding established tolerances.

In recent years, various techniques and approaches have been developed to attempt to control deviations in the output of extrusion systems to avoid these problems. One such approach is to utilize a gear pump following the extruder to meter the delivery of the molten thermoplastic material to the forming die. The basic construction and operation of gear pumps is well known, basically including a pair of counter-rotating intermeshing gears driven within a pump housing to transport the molten thermoplastic material in a positive displacement manner by entrapping the material between the teeth of the gears. As a result, the volumetric output of a gear pump is a function of its operational speed and is substantially unaffected by pressure surges and fluctuations in the input flow of thermoplastic material from the extruder. As a result, the use of a gear pump reduces variations in the quality of the extruded product, both on short-term and long-term bases, by delivering a substantially uniform volumetric flow of thermoplastic material to the die of the extrusion system. However, variations in the density of the thermoplastic material are substantially unaffected by the use of a gear pump and, therefore, such variations may still produce deviations in the weight per unit length of the extruded product.

More recently, considerable interest has developed in the utilization of so-called gravimetric extrusion control systems as an alternative or adjunct to gear pump-assisted extrusion control. Basically, gravimetric extrusion control utilizes a special feeding hopper for weighing the material input into the extruder over the course of extruder operation to determine the rate of material consumption by the extruder, with variations in the extruder consumption being utilized to adjust the rotational speed of the extruder screw or another operating parameter of the extruder to more uniformly control the rate at which the extruder output of molten material is delivered to the die.

While such gravimetric extrusion control systems have proved to be highly effective for their intended purpose when used in extrusion operations operating at relatively high material throughput rates, problems have been encountered in effectively operating gravimetric control systems at very low throughput rates such as are typically desired for extruding products such as the medical tubing mentioned above which require very precise control to maintain the end product within fine dimensional tolerances.

A typical conventional gravimetric weighing hopper utilizes a load cell on which a material feed container, typically formed as a funnel-like hopper, is supported at the material input opening to the extruder. The load cell deflects in direct relationship to the quantity of the material contained within the funnel. An electronic strain gauge supported within the load cell produces an output voltage directly proportional to the deflection of the load cell and transmits the output voltage to a central microprocessor or like controller for the extrusion system, which computes a weight value based upon the voltage transmitted by the strain gauge. By monitoring the weight of material within the hopper over time, the rate of material consumption by the extruder can be calculated and fluctuations therein can be identified and utilized to adjust operational parameters of the extrusion system.

At the same time, it is exceedingly important to maintain the purity of the thermoplastic material input into the extruder and, particularly, to prevent contamination thereof by airborne debris within the process environment which may settle into the hopper if left open to the ambient atmosphere. Accordingly, the practice initially developed of enclosing the upper end of the hopper with a flexible annular sock-like sleeve connected between the upper annular edge of the hopper and the supply structure used to deliver periodically charge material into the hopper.

While the use of such sleeve effectively prevented contamination of the material, the sleeve disadvantageously has been found to have a problematic effect on the accuracy of the load cell when an extruder system is operated at a relatively low throughput rate. Typically, such load cells are originally calibrated to a zero-value setting with the hopper empty, thereby to compensate for the extent to which the weight of the sleeve has an effect on the deflection of the load cell. While this means of calibrating the load cell should in theory be effective to ensure its accuracy, it has been found in practice that any manipulations of the sleeve over the course of use can change significantly the degree to which the load cell detects the weight of the sleeve.

This problem is exacerbated by the typical provision in gravimetric hoppers of a removable transparent plastic cylinder as an extension to the hopper funnel to enable the material within the funnel to be visually viewed by operating personnel and also to permit periodic access into the funnel interior for maintenance or the like. Typically, the sleeve is attached to the upper end of the removable transparent cylinder. It has been found that each removal and replacement of the cylinder will typically change the calibration of the load cell.

One alternative approach to this problem has been to eliminate the sleeve whereby the hopper funnel and the transparent cylinder are essentially "free floating" on the load cell, which significantly improves the accuracy of the load cell but provides no means to prevent the possible introduction of foreign contaminants into the hopper. In fact, to facilitate the periodic removability of the transparent cylinder, a relatively significant spacing must be left between the cylinder and the supply conduit through which the input material is charged into the hopper, in order to provide sufficient clearance for manipulation and lateral removal of the transparent cylinder.

SUMMARY OF THE INVENTION

It is accordingly an object of the present invention to provide an improvement in gravimetric weighing hoppers which overcomes the foregoing problems. In particular, it is an object of the present invention to provide a gravimetric weighing hopper with a unique material infeed arrangement by which the use of a conventional anti-contaminant sleeve may be eliminated without leaving the hopper substantially open to the influx of outside contaminants.

Briefly summarized, the gravimetric weighing hopper of the present invention basically includes a frame supporting an annular material infeed chute and a material outflow opening in fixed spaced relation to one another and an annular hopper wall removably supported axially between the infeed chute and the outflow opening with opposite axial ends of the annular hopper wall disposed annularly about the infeed chute and the outflow opening. According to the present invention, the infeed chute and the hopper wall have respective laterally adjacent annular edges at least one of which has a portion extending about at least approximately one-half of its annular extent which is spaced axially from the remainder of its annular extent in order to facilitate manipulated removal of the hopper wall from annularly about the infeed chute and laterally from between the infeed chute and the outflow opening.

In the preferred embodiment, the frame of the present gravimetric weighing hopper has a base for mounting to the extruder, a superstructure for connection to a source of supply for the charge material, and stanchions integrally connecting the base and the superstructure at a spacing from one another, the stanchions defining a laterally open area through which access to the hopper is possible. The base of the frame defines the material discharge opening for communication with the extruder and the superstructure includes the annular material infeed chute extending toward the base generally in alignment with the material discharge opening, the infeed chute terminating at an annular edge spaced from the base and from the discharge opening therein. A load cell is mounted on the base and includes a strain gauge for measuring a load value representative of a weight supported by the load cell. A material container is fixedly supported by the load cell in communication with the material discharge opening, the material container extending toward the infeed chute in general alignment therewith and terminating at a spacing from the annular edge of the infeed chute. In this manner, the material container is situated to receive from the infeed chute and transiently store a quantity of charge material while gradually delivering the material into the discharge opening.

The annular hopper wall is removably supported on the material container as an extension thereof extending toward the infeed chute in general alignment therewith. The annular hopper wall terminates at an annular edge disposed in laterally adjacent surrounding relation to the annular edge of the infeed chute at an annular spacing therefrom. As indicated above, at least one of the respective annular edges of the infeed chute and the annular hopper wall has a portion extending at least approximately one-half of its annular extent which is spaced axially from its remaining annular extent relative to the path of charge material flow through the infeed chute, the annular wall and the material container. In this manner, the annular spacing between the respective annular edges of the infeed chute and the annular wall can be relatively close while still permitting manipulated removal of the annular wall from annular surrounding relation to the annular edge of the infeed chute and laterally outwardly from between the infeed chute and the material container through the laterally open area defined by the stanchions of the frame.

Various embodiments of the basic invention described above are contemplated. By way of example, in one embodiment, one, and preferably both, of the respective annular edges of the infeed chute and the annular hopper wall are elliptically formed at an acute angle relative to the path of charge material flow through the infeed chute, the annular hopper wall and the material container. Alternatively, one or both of the respective annular edges of the infeed chute and the annular hopper wall can be formed with a notched area extending at an axial spacing from the remainder of the respective annular edges for approximately one-half of its annular extent. In either case, the angled or notched edges of the infeed chute and the annular hopper wall enable the respective annular edges thereof to be situated in relatively closely spaced relation during operation of the hopper while still permitting the annular hopper wall to be removed by tilted manipulation relative to the infeed chute. As will be recognized, the close spacing of these annular edges thereby substantially reduces the risk of foreign contaminants entering the hopper, while at the same time only the material container and the annular hopper wall rest on and affect the calibration of the load cell, whereby substantially greater accuracy in operation of the load cell can be achieved at low material throughput rates.

DETAILED DESCRIPTION OF THE PREFERRED EMBODIMENTS

Figure 1:
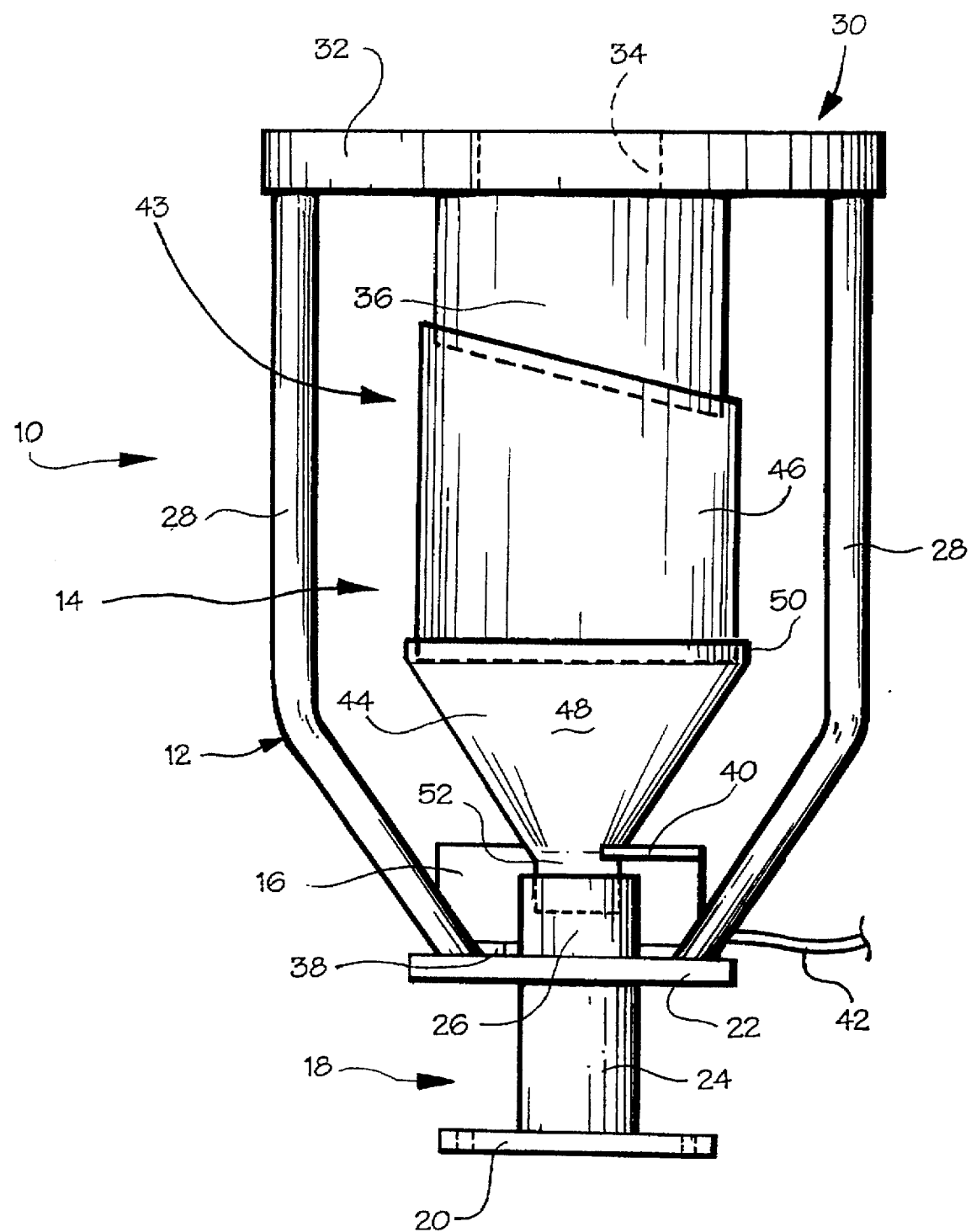
FIG. 1 is a side elevational view of a gravimetric weighing hopper in accordance with one preferred embodiment of the present invention, depicting the annular hopper wall in its operative disposition supported on the material container.
Figure 2:
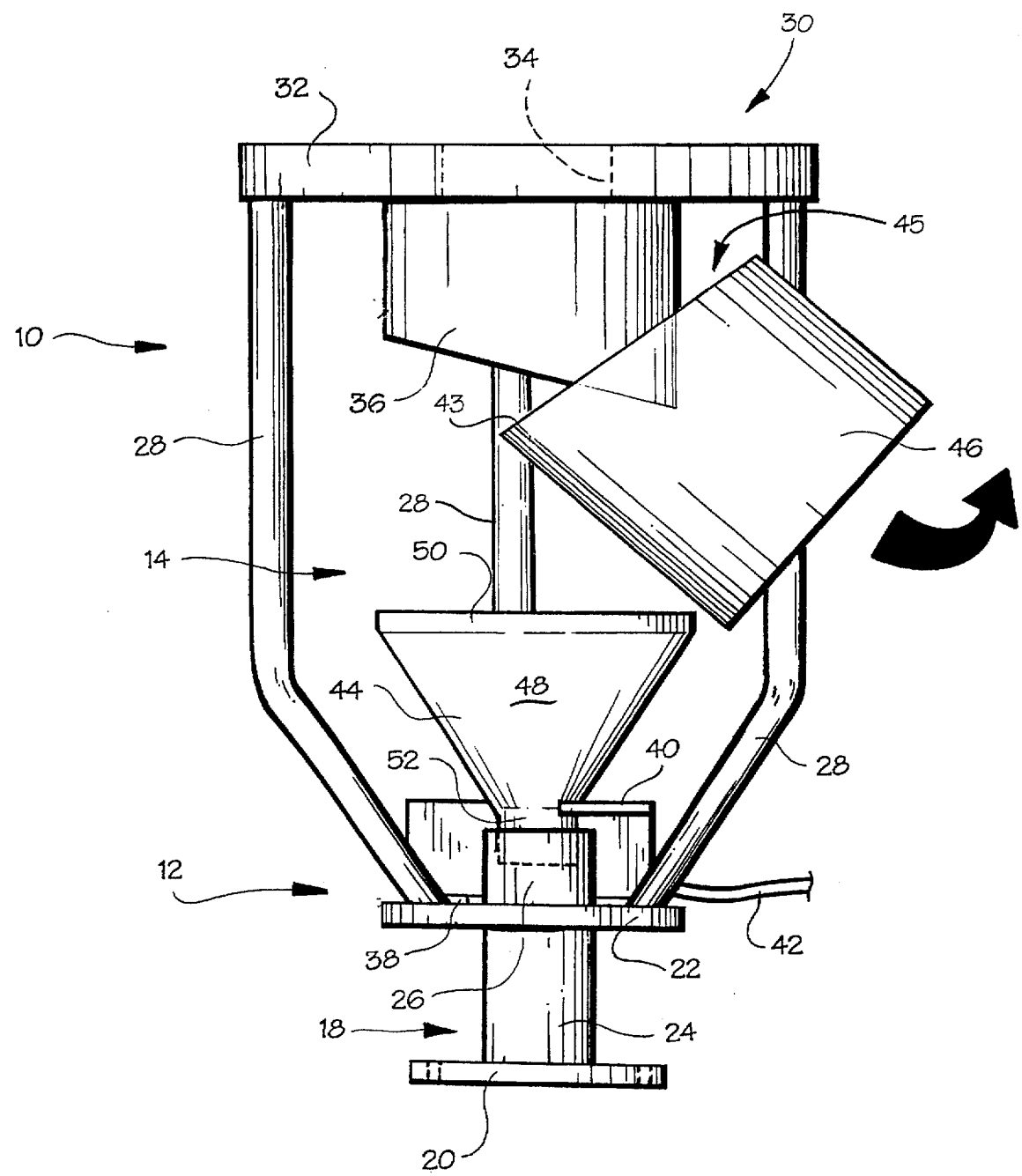
FIG. 2 is another side elevational view of the gravimetric hopper of FIG. 1, but depicting the manipulation of the annular hopper wall during lateral removal from between the infeed chute and the material container.

Referring now to the accompanying drawings and initially to FIGS. 1 and 2, one embodiment of a gravimetric weighing hopper in accordance with the present invention is indicated generally at 10 and basically includes a rigid frame structure generally indicated at 12 by which the hopper may be mounted on a conventional thermoplastic extruder (not shown), a material container assembly generally indicated at 14, and a load cell 16 supporting the material container assembly 14 on the frame 12.

The frame 12 has a base 18 formed by a lower mounting plate 20 for bolted attachment to an extruder, an upper base plate 22 spaced above the mounting plate 20 in parallel relation therewith, and a tubular discharge conduit 24 extending perpendicularly between the mounting and base plates 20,22, with a collar portion 26 of the conduit 24 projecting upwardly from the base plate 22. Three support stanchions 28 extend upwardly from the base plate 22 at substantially equidistant spacings about its periphery and support a frame superstructure, indicated generally at 30 at an upward spacing from the base plate 22. The frame superstructure 30 includes a horizontally disposed support plate 32 on which a material supply hopper (not shown) or other suitable material supply structure may be mounted or connected to deliver charge material for the extruder through a material infeed opening 34 formed centrally in the support plate 32. A material infeed chute 36, preferably in the form of a cylindrical or slightly conical annular wall, projects downwardly from the underside of the support plate 32 concentrically about the material infeed opening 34 and coaxially aligned with the collar portion 26 of the discharge conduit 24.

The load cell 16 may be of substantially any suitable conventional construction having a strain gauge (not shown) or other suitable means for generating an electrical output signal proportional to deflection of the load cell. Various forms of such load cells are conventionally available commercially and, therefore, the load cell 16 is depicted in the drawings only schematically for sake of simplicity of illustration. In the representative embodiment illustrated, one end of the load cell 16 is mounted by a bracket 38 to extend in cantilevered fashion horizontally at a slight spacing above the upper surface of the base plate 22, with the outer free end of the load cell 16 being rigidly affixed to the lower end of the material container assembly 14 by another bracket 40. As will thus be understood, the load cell 16 is situated to be deflected in direct relation to the weight of the material container assembly 14 and its contents. An electrical cable 42 extends outwardly from the load cell 16 to a central microprocessor or other controller (not shown) for the associated extrusion system to supply the load cell with operating electrical power and for return transmission by the load cell to the controller of a variable output voltage proportional to the deflection of the load cell recognized by the strain gauge, thereby reflecting the total weight of the material container assembly 14 and its contents.

The material container assembly 14 basically comprises two components: a funnel 44 and an annular hopper wall formed as a cylindrical wall 46 mounted on the funnel as an extension thereof. The funnel 44 has a conical main body 48 which tapers narrowingly from a cylindrical upper flange 50 to a substantially reduced cylindrical lower neck portion 52, the funnel 44 being rigidly affixed to the load cell bracket 40 at the juncture between the conical body 48 and the neck portion 52 to dispose the funnel 44 coaxially with the tubular discharge conduit 24 and with the material infeed chute 36, with the neck portion 52 of the funnel 44 disposed within but out of contact with the collar portion 26 of the discharge conduit 24. The cylindrical wall 46 is of a slightly reduced diameter from that of the upper flange 50 of the funnel 44 to rest removably within the upper end of the funnel 44 coaxially therewith, the cylindrical wall 46 extending upwardly therefrom into surrounding relation to the material infeed chute 36 at a relatively close annular spacing therebetween. The wall 46 is preferably fabricated of a transparent plastic material to permit an operator to view the contents of the container assembly 14.

The basic operation of the gravimetric weighing hopper 10 during a normal extrusion process is essentially the same as with any conventional gravitational weighing hopper. Thermoplastic material, typically in pellet form, is periodically charged into the hopper 10 through the infeed opening 34 in the upper support plate 32 of the frame superstructure 30 and is contained within the funnel 44 and the cylindrical wall 46 of the material container assembly 14 while being gradually fed through the lower neck 52 of the funnel 44 into the tubular discharge conduit 24 and therefrom into the extruder. As this material feeding operation progresses, the load cell is continuously or at least periodically delivering to the central controller a variable voltage representative of the weight of the charge material, whereby the controller can compute the rate of material consumption by the extruder and, in turn, adjustably control operating parameters of the extrusion system as necessary to control dimensional and like parameters of the extruded product within predetermined tolerances.

As with prior art gravimetric weighing hoppers, it is desirable to be able to periodically remove the cylindrical wall 46 from the funnel 44 for viewing of the interior of the funnel and if and as otherwise necessary for periodic maintenance of the hopper. At the same time, it is highly desirable to maintain the annular spacing between the upper end of the cylindrical wall 46 and the lower end of the material infeed chute 36 as small as possible to minimize the risk of contaminants entering the extrusion system. However, as will be understood, the closeness of the spacing between the cylindrical wall 46 and the infeed chute 36 directly affects the ability to manipulate the cylindrical wall 46 upwardly out of the cylindrical flange 50 of the funnel 44 and laterally outwardly from about the infeed chute 36. If both the lower end edge of the infeed chute 36 and the upper end edge of the cylindrical wall 46 are formed precisely circularly in a radial plane perpendicular to their respective axes, then the physical relationship of the components of the hopper would dictate that the diameter of the lower end of the infeed chute 36 must be significantly reduced from the diameter of the cylindrical wall 46 to enable the cylindrical wall 46 to be manipulated upwardly out of the funnel 44 and then laterally outwardly from between the funnel 44 and the infeed chute 36, which would disadvantageously leave a significant spacing between these components during operation and increase the risk that outside contaminants could enter the extrusion system, which is precisely the problem experienced in the prior art.

According to the present invention, this problem is substantially eliminated by forming one or both of the adjacent annular edges of the infeed chute 36 and the cylindrical wall 46 with a portion of the annular edge indicated generally at 43, extending at least approximately one-half of its annular extent, at an axial spacing from the remainder of its annular extent indicated generally at 45. In the embodiment of FIGS. 1 and 2, this is accomplished by forming the respective annular edges of the infeed chute 36 and the cylindrical wall 46 at corresponding acute angles relative to their respective aligned axes which, as depicted in FIG. 2, enables the outer diameter of the infeed chute 36 to be relatively closely spaced to the inner diameter of the cylindrical wall 46 while still readily facilitating manipulation of the cylindrical wall 46 upwardly out of the flange 50 of the funnel 44 and then laterally tilting the cylindrical wall 46 relative to the material infeed chute 36 for lateral removal outwardly through the space between the frame stanchions 28. Thus, by this simple expedient, the heretofore opposed objectives of protecting the charge material from outside contamination while also optimizing the accuracy of the load cell can both be accomplished in an extremely simple manner.

Figure 3:
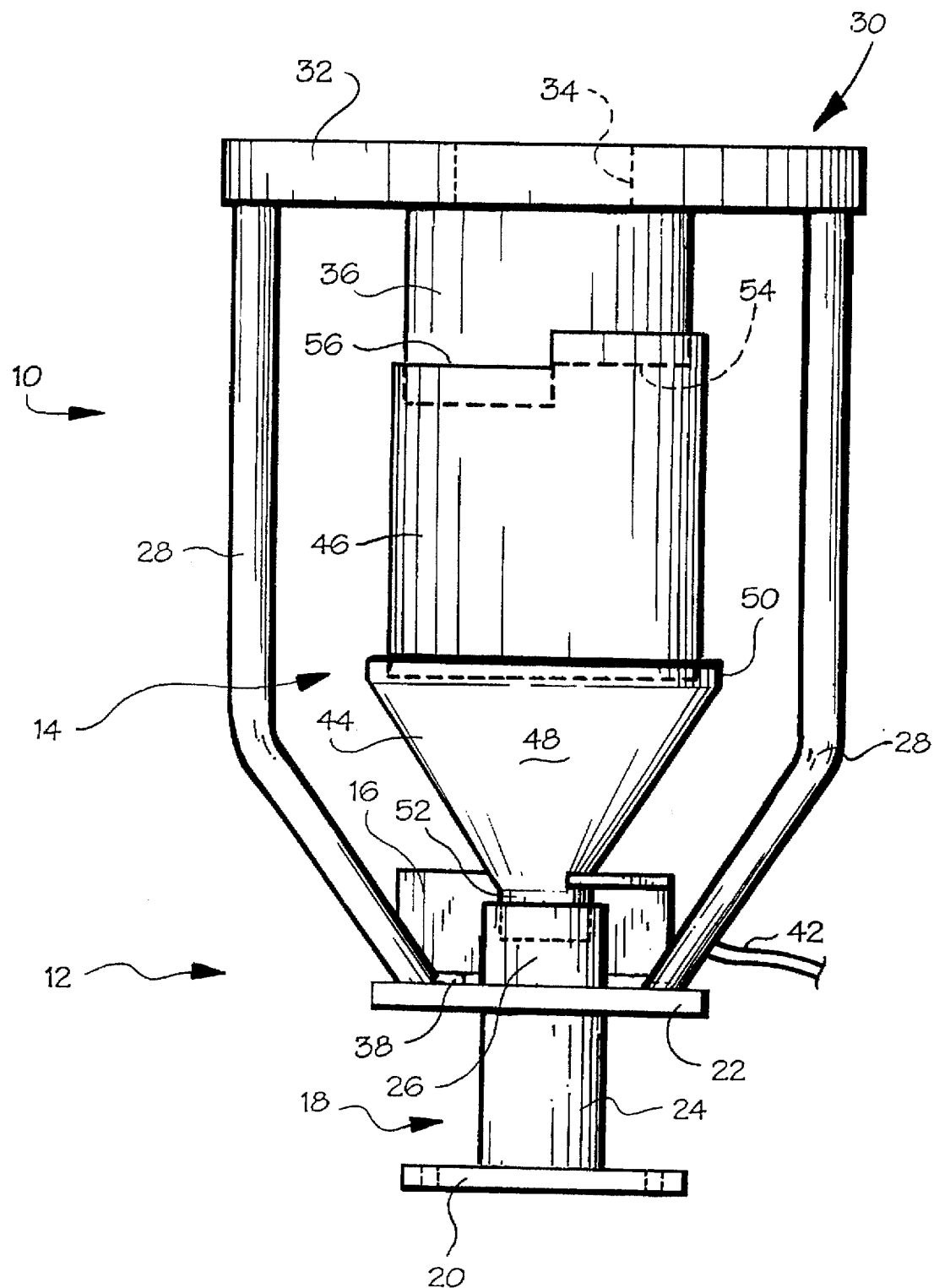
FIG. 3 is a side elevational view of a gravimetric weighing hopper according to another embodiment of the present invention, depicting similarly to FIG. 1 the annular hopper extension wall as disposed during normal operation.
Figure 4:
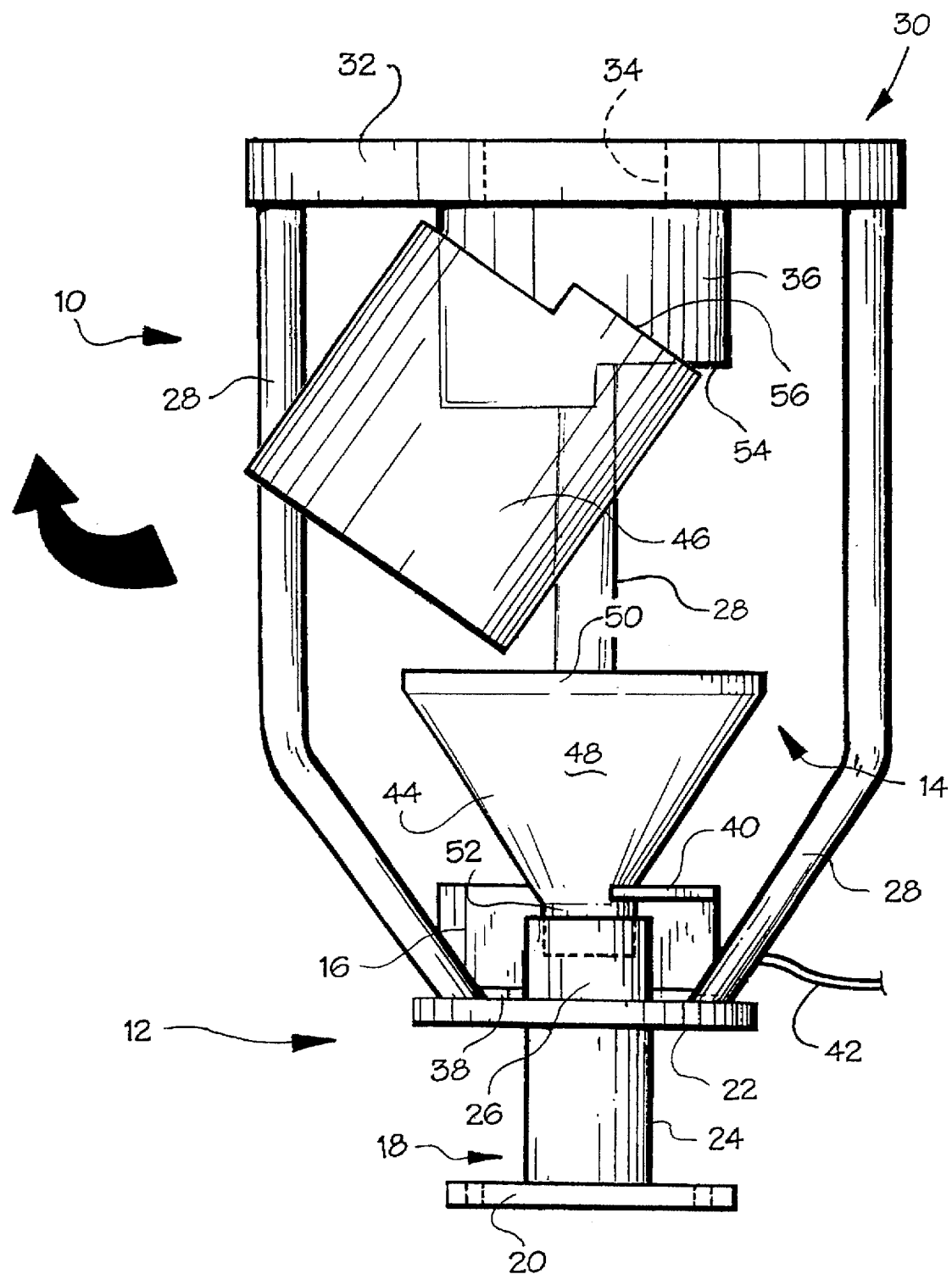
FIG. 4 is another side elevational view of the gravimetric weighing hopper of FIG. 3, but showing the annular hopper extension wall as being manipulated for removal laterally from between the infeed chute and the material container.

Of course, those persons skilled in the art will readily recognize that the angled formation of the annular end edges of the infeed chute 36 and the cylindrical wall 46 is not necessarily the only possible way of accomplishing the present invention. Rather, as indicated above, it is contemplated that various edge configurations of the infeed chute and the cylindrical wall, wherein a portion of one or both edges about at least approximately one-half of the annular extent thereof is spaced axially from the remaining annular extent thereof. By way of additional example, the embodiment of FIGS. 3 and 4 depicts an alternative construction equally capable of accomplishing the same result. The gravimetric weighing hopper of FIGS. 3 and 4 is substantially identical in construction to that of FIG. 1, and therefore like reference numerals identify like components, except as to the configuration of the respective annular edges of the material infeed chute 36 and the annular wall 46. In particular, instead of the respective annular edges being angled relative to their aligned axes, each annular edge is formed with a respective notched area 54,56 about approximately one-half of its annular extent, each notch 54,56 having an axial dimension at least exceeding the axial dimension of the flange 50 of the funnel 44. In normal operation, the cylindrical wall 46 is rotated to dispose its notch 56 adjacent the unnotched annular extent of the infeed chute 36 and vice versa, thereby minimizing the open space between the infeed chute 36 and the cylindrical wall 46. When it is desired or necessary to remove the cylindrical wall 46, essentially the same operation as described above is carried out by lifting the cylindrical wall 46 out of the flange 50 of the funnel 44 and then tilting the wall 46 relative to the infeed chute 36 for laterally outward removal.

In sum, it will therefore be recognized and understood that the present invention provides a substantial improvement over the prior art by providing a simplified hopper container assembly which substantially encloses the interior of the container assembly to shield the charge material therein from outside contamination without requiring any physical connection between the container assembly and the frame structure of the hopper, thereby to optimize the accurate operation of the load cell at the same time.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A gravimetric weighing hopper for feeding a charge material to a thermoplastic extruder, comprising a frame supporting an annular material infeed chute and a material discharge opening in fixed spaced relation to one another, and an annular hopper wall defining axial openings at opposite ends thereof, the annular hopper wall being removably supported axially between the infeed chute and the discharge opening with the opposite ends disposed annularly about the infeed chute and the discharge opening, the infeed chute and the annular hopper wall having laterally adjacent annular edges and at least one of the infeed chute and the annular hopper wall having a portion extending approximately one-half its annular extent, said portion being spaced axially from a remainder of its annular extent to facilitate manipulated removal of the hopper wall from annularly about the infeed chute and laterally from between the infeed chute and the discharge opening.

2. A gravimetric weighing hopper according to claim 1 wherein at least one of the respective annular edges of the infeed chute and the extension wall are elliptically formed at an acute angle relative to the path of charge material flow through the infeed chute and the annular wall.

3. A gravimetric weighing hopper according to claim 1 wherein each of the respective annular edges of the infeed chute and the extension wall are elliptically formed at an acute angle relative to the path of charge material flow through the infeed chute and the annular wall.

4. A gravimetric weighing hopper according to claim 3 wherein the respective annular edges of the infeed chute and the extension wall are formed at corresponding acute angles.

5. A gravimetric weighing hopper according to claim 1 wherein at least one of the respective annular edges of the infeed chute and the extension wall has a notched area extending at an axial spacing from the remainder of the respective annular edge for approximately one-half of its annular extent.

6. A gravimetric weighing hopper according to claim 1 wherein each of the respective annular edges of the infeed chute and the extension wall has a notched area extending at an axial spacing from the remainder of the respective annular edge for approximately one-half of its annular extent.

7. A gravimetric weighing hopper for feeding a charge material to a thermoplastic extruder, comprising:

(a) a frame having a base for mounting to the extruder, a superstructure for connection to a source of supply for the charge material, and stanchions integrally connecting the base and the superstructure at a spacing from one another and defining a laterally open area for access to the spacing between the base and the superstructure, the base defining a material discharge opening for communication with the extruder and the superstructure including an annular material infeed chute extending toward the base generally in alignment with the material discharge opening and terminating at an annular edge of the infeed chute spaced from the base and the discharge opening therein;

(b) a load cell mounted on the base and having a strain gauge for measuring a load value representative of a weight supported by the load cell;

(c) a material container fixedly supported by the load cell in communication with the material discharge openings, the material container extending toward the infeed chute in general alignment therewith and terminating at a spacing from the annular edge of the infeed chute, for receiving from the infeed chute and transiently storing a quantity of charge material while gradually delivery the charge material into the material discharge opening; and (d) an annular extension wall removably supported on the material container to extend toward the infeed chute in general alignment therewith, the extension wall terminating at an annular edge disposed in laterally adjacent surrounding relation to the annular edge of the infeed chute at an annular spacing therefrom;

(e) at least one of the respective annular edges of the infeed chute and the extension wall having a portion extending approximately one-half of its annular extent which is spaced axially from the remaining annular extent thereof relative to the path of charge material flow through the infeed chute, the annular wall and the material container, whereby the annular spacing between the respective annular edges of the infeed chute and the annular wall can be relatively close while still permitting manipulated removal of the annular wall from annular surrounding relation to the annular edges of the infeed chute and laterally outwardly from between the infeed chute and the material container through the laterally open area defined by the stanchions of the frame.

8. A gravimetric weighing hopper according to claim 7 wherein at least one of the respective annular edges of the infeed chute and the extension wall are elliptically formed at an acute angle relative to the path of charge material flow through the infeed chute, the annular wall and the material container.

9. A gravimetric weighing hopper according to claim 7 wherein each of the respective annular edges of the infeed chute and the extension wall are elliptically formed at an acute angle relative to the path of charge material flow through the infeed chute, the annular wall and the material container.

10. A gravimetric weighing hopper according to claim 9 wherein the respective annular edges of the infeed chute and the extension wall are formed at corresponding acute angles.

11. A gravimetric weighing hopper according to claim 7 wherein at least one of the respective annular edges of the infeed chute and the extension wall has a notched area extending at an axial spacing from the remainder of the respective annular edge for approximately one-half of its annular extent.

12. A gravimetric weighing hopper according to claim 7 wherein each of the respective annular edges of the infeed chute and the extension wall has a notched area extending at an axial spacing from the remainder of the respective annular edge for approximately one-half of its annular extent.

* * * * *